3,287,097
METHOD AND APPARATUS OF FUSING A COATING TO A METAL SURFACE
Eugene J. Limpel, Thiensville, Wis., assignor to A. O. Smith Corporation, Milwaukee, Wis., a corporation of New York
Filed Jan. 2, 1962, Ser. No. 163,642
2 Claims. (Cl. 65—40)

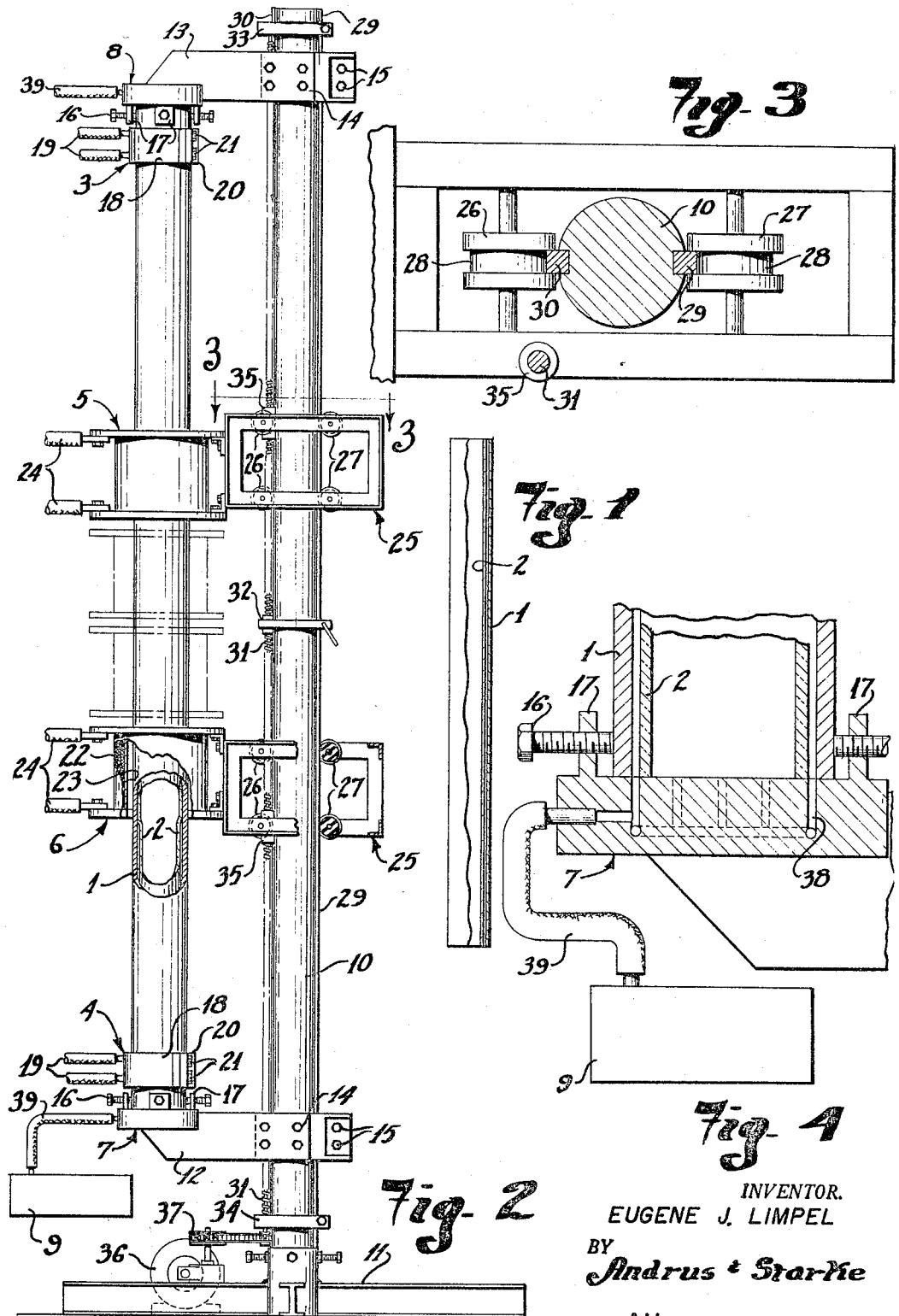

This invention relates to a method and apparatus for fusing a coating to a metal surface and particularly to a method and apparatus for fusing of a glass or vitreous enamel to the inner wall of a metal tube or pipe.

Metal surfaces are often lined with vitreous enamel or the like to substantially eliminate corrosion of the adjacent metal surface and in some pipe applications to reduce the friction to flow through the pipe or the like. For example, the recently issued United States Patent 2,986,847 to Minoru Sato on June 6, 1961, discloses various methods of lining a metal tube with a glass or vitreous enamel. In the Sato patent, a glass tube is located within the pipe which is successively raised to a fusing temperature while maintaining a pressure within the glass tube which forces it into intimate engagement with the pipe wall.

A highly satisfactory method of fusing vitreous enamel to pipe members and the like is disclosed in United States Patent 2,848,566 which issued to the present inventor on August 19, 1958 and discloses an induction heating system for fusing of vitreous enamel to steel articles. Although the disclosed method is highly satisfactory, it has been found that care must be taken to avoid separation of the glass coating from the steel member due to the rapid cooling as the induction coil moves along the pipe.

In relatively small diameter pipes and the like, relatively high frequency currents are employed in the induction heating units in order to maintain a high quality fusion of the glass to the metal member. High frequency power sources of sufficient power levels to increase the metal member to the fusing temperature are large, bulky and relatively expensive.

The present invention is particularly directed to a method and apparatus for producing a glass to metal bond having excellent mechanical properties.

In accordance with the present invention, the metal member to be coated is heated by passing a current between a pair of contacts secured to the member and thus through the member to a temperature approaching but below the fusing temperature of the vitreous enamel or the like. Induction coil means are then progressively moved over the surface of the metal member to increase the temperature of the member to the fusion temperature by induction heating. After complete fusion of the coating to the metal member, the resistance heating is maintained at a selected level for a predetermined time to slowly cool the member.

It has been found that the preheating and postheating of the member by the resistance heating process substantially eliminates cracking of the glass from the metal member. Further, resistance heating is relatively inexpensive and a simple method of heating the metal members. Relatively small and low cost induction heating equipment can be employed for increasing the temperature of the member to the fusing temperature.

The present invention is adapted to fusing a glass tube to the inner wall of a metal tube. The glass tube is coaxially secured within the pipe which is heated by resistance heating to raise the temperature of the pipe to somewhat below the fusing temperature of the glass tube. Induction heating means are provided to progressively increase the temperature of the steel pipe from the center to the opposite ends to the fusing temperature end to soften the glass tube to a plastic condition and effect a fusion of the glass tube to the metal tube. A vacuum is established between the glass tube and the metal pipe causes the glass tube to progressively move outwardly into firm engagement with the metal as the tube is heated to a plastic condition by the induction heating to create a firm bonding of the tube to the wall. The vacuum further withdraws all air and gases from the bonding or fusing area to prevent interference therewith.

The present method and apparatus thus provide a relatively inexpensive induction heating apparatus for fusing of a glass lining to metallic members. The invention maintains a smaller temperature differential between the hot and cold zones in the heated member and thus reduces the strain in the fused glass liner.

The drawing furnished herewith illustrates the best mode presently contemplated for carrying out the invention.

In the drawing:

FIG. 1 is a view partly in elevation and partly in section showing a glass tube disposed within a metal tube;

FIG. 2 is an elevational view of a fusing apparatus constructed in accordance with the present invention;

FIG. 3 is a side elevational view of the apparatus shown in FIG. 2; and

FIG. 4 is an enlarged fragmentary view of one end of a pipe and the adjacent portion of the fusing apparatus of FIG. 2.

Referring to the drawing and particularly to FIG. 1, a tubular pipe 1 of suitable steel or the like is mounted in a vertical position with a glass tube 2 coaxially disposed therein. Glass tube 2 generally corresponds to the inner diameter of the pipe 1 and is to be fused to the inner wall surface thereof. Referring to FIGS. 2 and 3, the concentrically arranged pipe 1 and glass tube 2 are secured in a vertical position in a fusing apparatus constructed in accordance with the present invention. Generally, the fusing apparatus includes an upper resistance heating contact 3 and a lower resistance heating contact 4 secured respectively to the opposite ends of the pipe 1 for passing a heating current through the pipe. Induction heating coils 5 and 6 encircle the pipe 1 and are initially disposed adjacent the center of the pipe 1 as shown in phantom. The contacts 3 and 4 are connected to a suitable source of power as hereinafter described and initially heat and establish current flow through the pipe 1 which increases the temperature of the pipe to immediately below the fusing temperature of the glass tube 2. Subsequently, the induction coils 5 and 6 are energized to create circulating heating currents within the pipe 1 for raising the temperature to the fusing temperature. The coils 5 and 6 are simultaneously and slowly moved in opposite directions to progressively increase the temperature of pipe 1 and bond the tube 2 to the pipe 1. Vacuum couplings 7 and 8 are secured to opposite ends of pipe 1 and connected to a vacuum pump 9 for establishing a partial vacuum between the tube 2 and pipe 1. The atmospheric pressure internally of tube 2 forces the tube outwardly into intimate contact with pipe 1.

In the illustrated embodiment of the invention, a supporting column 10 is provided for supporting the pipe 1 and carrying the coils 5 and 6 and includes a suitable base or pedestal 11 secured to the lower end.

Supporting platforms 12 and 13 are movably secured to the column 10 and located to engage the opposite ends of the pipe 1 and firmly support the pipe 1 in the vertical position.

Each of the platforms 12 and 13 is similarly constructed and includes a split clamp 14 encircling the colum 10 with suitable bolts 15 passing through split portions of the clamp 14 to releasably secure the corresponding platform to the column 10. The vacuum couplings 7 and 8 form a part of platforms 12 and 13, respectively, and are located in alignment with the ends of the pipe 1 which is clamped therebetween. Lock bolts 16 are carried by suitable upstanding brackets 17 on couplings 7 and 8 and circumferentially distributed about the pipe 1. The bolts 16 are positioned in bearing engagement with the ends of the pipe 1 and securely support the pipe 1 in the vertical position during the fusing of the glass tube 2 thereto.

Each of the contacts 3 and 4 is also similarly constructed and includes a U-shaped contact block 18 connected to suitable power lines 19. A clamp bracket 20 spans the open end of the U-shaped contact blocks 18 and is releasably secured thereto by suitable bolts 21 for moving the contact block 18 into firm electrical engagement with the corresponding ends of the pipe.

The current through the pipe 1 between contacts 3 and 4 increases the temperature of the pipe 1 to approach the fusing temperature of the glass tube 2. The induction heating coils 5 and 6 are employed to raise the pipe 1 to the final fusing temperature.

The induction heating coils 5 and 6 are also similarly constructed and each includes a winding 22 carried by a tubular coil form 23 which is mounted to slide over the pipe 1. Power lines 24 connect each of the windings 22 to a high frequency power source, not shown.

The frequency of the high frequency source is determined generally by the diameter of the pipe 1. Generally, applicant has found that a thousand cycle current satisfactorily heats black iron or steel piping two inches in diameter.

A separate carriage 25 is movably mounted to the column 10 and supports a corresponding coil form 23. Pairs of vertically spaced guide wheels 26 and 27 are rotatably secured to the carriage 25 on opposite sides of the column 10. The periphery of the wheels 26 and 27 is grooved as at 28 to mate with vertical guide tracks 29 and 30 keyed to the column 10.

A drive screw 31 is mounted coextensively of the column 10 and is rotatably supported in a central bearing 32 which is secured centrally of the column 10 and similar end bearings 33 and 34 which are secured to the opposite ends of the column 10. Ball bearing screw followers 35 are fixedly secured one each to carriages 25 and threadedly mounted on the adjacent screw 31. A suitable drive motor 36 is mounted adjacent the base of the column 10 and is coupled to the lower end of screw 31 by a chain drive 37 to rotate the screw 31 and move the followers 35 in a vertical direction. The threading of the screw 31 on opposite sides of the central bearing 32 is in opposite directions such that the rotation of the screw 31 moves the upper and lower carriages 25 in opposite directions. The coils 5 and 6 are initially positioned adjacent the center bearing 32 and are simultaneously moved in opposite directions from the bearing 28 to progressively heat the pipe 1 from the center to the ends thereof. The increased temperature of pipe 1 also results in heating of the glass tube 2 to a soft plastic condition.

The glass tube 2 is forced into firm engagement with the internal surface of the pipe 1 by operating vacuum pump 9 to establish a vacuum between the pipe 1 and tube 2. The vacuum couplings 7 and 8 are diagrammatically illustrated with vertical passageways 38 aligned with the space between pipe 1 and tube 2 and connected to the vacuum lines 39 to pump 9.

The operation of the illustrated embodiment of the invention is summarized as follows.

The metal pipe 1 and the glass tube 2 in combination are mounted in position between the supporting platforms 12 and 13 with the induction heating coils 5 and 6 encircling the middle of the pipe 1. The contacts 3 and 4 are secured to the pipe 1 and the power source connection completed to establish a current through the pipe 1. The resistance heating of the pipe 1 increases the temperature thereof to a predetermined temperature somewhat below the fusion temperature of the glass tube 2.

When the pipe 1 reaches the predetermined temperature, the induction coils 5 and 6 are energized to establish an induced current in the adjacent portion of the pipe 1 which increases the temperature thereof to the fusion temperature. When the pipe 1 adjacent the coil reaches the fusion temperature, the constant speed motor 36 is energized to slowly move the coils 5 and 6 in opposite directions toward the ends of the pipe 1 and to progressively increase the temperature of the pipe 1 to the fusion temperature of the glass tube 2 and to soften the immediately adjacent portion of the glass tube 2.

Vacuum pump 9 is operated to establish a vacuum between the pipe 1 and tube 2. The softened plastic tube 2 collapses into firm contact with the pipe 1 as a result of the atmospheric pressure within tube 2.

Although the present invention has been particularly described and illustrated in connection with the fusing of a glass tube to the wall of a metal pipe, the method and apparatus is equally applicable to fusing of vitreous enamel frit which is sprayed or otherwise applied to the pipe 1 prior to mounting in the fusion apparatus or just immediately ahead of the movement of the induction heating coils 5 and 6, for example.

The simultaneous use of resistance and induction heating allows much closer control of the temperature and substantially reduces the power input to the induction coils. The dual resistance and induction heating also allows much more rapid movement of the induction heating coils and the fusion process.

Various modes of carrying out the invention are contemplated as being within the scope of the following claims particularly pointing out and distinctly claiming the subject matter which is regarded as the invention.

I claim:

1. In the method of making a glass coated tubular member, the improvement comprising resistance preheating the tubular member with a glass tube disposed therein by passing an electric current through the tubular member, maintaining the temperature of said glass tube at a temperature approaching but below its fusing temperature, simultaneously providing supplemental heat to successive localized portions of said tubular member by inducing heat in the tubular member by bringing the tubular member into a high frequency magnetic field thereby increasing the temperature of the tubular member progressively to the fusion temperature of the glass tube, applying a vacuum between the glass tube and the tubular member to move the glass tube progressively outwardly into firm engagement with the tubular member as the tube is heated to a plastic condition by the supplemental heat induced therein to bond the glass tube to said tubular member and remove all air and gases from the bonding area, and post heating said glass coated tubular member by passing an electric current therethrough for a predetermined time to slowly cool the glass coated metal member whereby cracking of the glass from the tubular member is eliminated.

2. Apparatus for fabricating a glass coated metal tubular member comprising, in combination, support means for securing the tubular member in a vertical position, means for disposing a glass tube inside said tubular member, resistance heating means adapted to be secured to the tubular member for establishing a current through the tubular member for preheating and post heating of the tubular member, induction heating means for inducing heat in said tubular member by bringing the tubular member into a high frequency magnetic field, said induction heating means being cooperable with said resistance heating means and adapted for relative movement up and down said tubular member to locally increase the temperature of the tubular member to the fusing temperature of the glass tube and to soften the tube to a flowing condition, carrier means for said induction heating means for moving said induction heating means axially of the tubular member, and means for forcing the softened glass tube into contact with the tubular member.

References Cited by the Examiner

UNITED STATES PATENTS

| | | | |
|---|---|---|---|
| 2,408,339 | 9/1946 | Pike | 65—40 |
| 2,462,205 | 2/1949 | Machlett et al. | 65—40 |
| 2,511,914 | 6/1950 | Hass | 65—154 |
| 2,848,566 | 8/1958 | Limpel | 65—40 |
| 2,986,847 | 6/1961 | Sato | 65—40 |

DONALL H. SYLVESTER, *Primary Examiner.*

G. R. MYERS, *Assistant Examiner.*